Patented June 4, 1929.

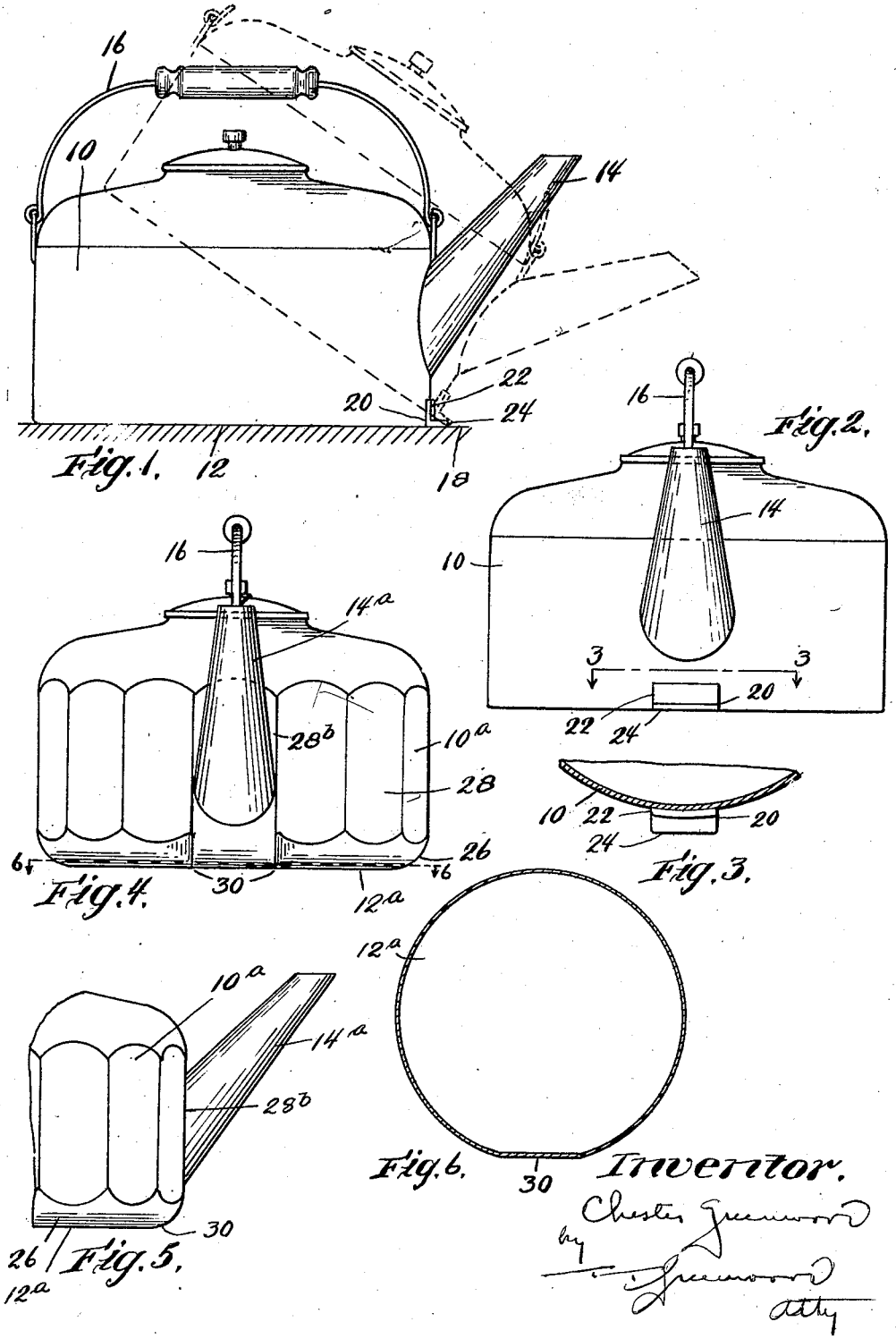

1,716,124

UNITED STATES PATENT OFFICE.

CHESTER GREENWOOD, OF FARMINGTON, MAINE.

KETTLE.

Application filed April 30, 1928. Serial No. 273,789.

This invention relates to liquid containers and particularly to tea kettles and the like.

A tea kettle usually is cylindrical and thus has a circular bottom edge. When the liquid in the kettle is poured out through the spout, the tea kettle is usually tilted upwardly while it rests upon its support, as the top of a stove. That small portion of the circular bottom edge of the kettle which lies immediately under the spout thus serves to support the kettle. As a consequence, this portion of the kettle wears the most rapidly and soon has a hole therethrough, while the rest of the kettle may be in good condition.

It is an object of the present invention to provide a tea kettle and the like with a broad wear receiving surface at its bottom edge under the spout of the kettle, or that portion of the kettle which acts as a fulcrum about which the kettle is tilted, to serve as a fulcrum and to take the wear caused by the tilting of the kettle thus to extend the life of the kettle.

A further object of the invention is the provision of a kettle having a circular bottom which is provided with a relatively broad face having a large surface extent and upon and about which the kettle is adapted to be tilted.

A further object of the invention is generally to improve the construction of kettles and pots.

Fig. 1 is a side elevation of a tea kettle embodying the invention.

Fig. 2 is a front elevation of the kettle of Fig. 1.

Fig. 3 is a section taken along line 3—3 of Fig. 2.

Fig. 4 is a modified construction of a kettle embodying this invention.

Fig. 5 is a partly side elevation of the kettle of Fig. 4.

Fig. 6 is a section taken along line 6—6 of Fig. 4, and illustrating especially the arrangement of the straight fulcrum edge at the bottom of the kettle.

The tea kettle illustrated in Fig. 1 has a circular cylindrical side wall 10, a flat bottom wall 12, a spout 14, and handle 16. The bottom wall is adapted to rest directly upon the top of a stove or other support. The tea kettle is adapted to be tilted as shown in the dotted lines, Fig. 1, above the support as the top of a stove 18. To protect the circular edge formed between the cylindrical side wall 10 and bottom wall 12 from wear occasioned by the tilting of the kettle, I provide a wear-receiving fulcrum member 20 which is located immediately under the spout 14. The fulcrum member may be of any suitable shape and size but preferably is of angle shape and has an upstanding leg 22 that is conformed in curvature with the curvature of the side wall 10 and is secured permanently thereto by suitable means. The fulcrum member also is provided with a horizontally extended leg 24 which underlies the spout 14 and is flush with and extends outwardly beyond the bottom 12 of the kettle. With this arrangement, when the kettle is tilted as shown in the dotted line, Fig. 1, the weight of the kettle is supported by the leg 24 of the fulcrum and consequently wear on the bottom edge of the kettle is prevented. The leg 24 is amply broad in extent, relatively thick, and has a relatively long transverse extent beneath the spout, so that it can withstand much use before it becomes materially worn.

In the modified form of kettle illustrated in Figs. 4 and 5, the bottom wall 12$^a$ and side wall 10$^a$ are integral and the two walls are connected by a curved circular bottom edge 26. The side wall 10$^a$ is also formed with a series of vertically elongated flat panels 28 in one of which panels 28$^b$ the spout 14$^a$ is located.

In applying my invention to this type of kettle, I extend the flat panel 28$^b$ downwardly below the bottom line of the other panels and continue it across the curved bottom edge 26 until it meets the bottom wall 12$^a$, thus providing a straight fulcrum edge 30 which is transversely horizontal in the plane of the bottom wall 12$^a$, and has a straight length equal to the width of the panel. While the bottom edge is not reinforced with additional metal in this modification, the construction provides a flucrum edge 30 which has a long line of contact with the support so that the wear is distributed over a considerable area and consequently the bottom edge of the kettle will not wear out rapidly.

I claim:

1. A kettle having side and bottom walls, and a generally circular bottom edge between said walls, and a fulcrum member carried by said kettle having a bottom surface which is on the level of and extends forwardly beyond said bottom wall, and is of relatively long horizontal extent and provides a wear receiving member upon which said kettle is adapted to tilt.

2. A kettle having side and bottom walls, and a generally circular bottom edge between said walls, and a fulcrum member carried by said kettle having a bottom surface which is on the level of and extends forwardly beyond said bottom wall, and is of relatively long horizontal extent and provides a wear receiving member upon which said kettle is adapted to tilt, said kettle having a spout which is located above the fulcrum member.

3. A kettle having side and bottom walls, and a circular edge between said walls, and a fulcrum member having an upstanding leg carried by said wall and a flat outstanding leg which is on the level of said bottom wall, and on and about which said kettle is adapted to tilt.

4. A tea kettle having a cylindrical side wall, a bottom wall, a circular edge between said bottom and side walls, a spout carried by said side wall above said bottom edge and a fulcrum member located beneath said spout having an upstanding leg which is fixed to said side wall and a horizontally flat outstanding leg which is level with said bottom wall and upon which said kettle is adapted to tilt.

5. A kettle having a spout, side and bottom walls, and a circular edge between said walls, and a fulcrum member carried by the kettle beneath said spout and having a fulcrum surface which is on the level of said bottom wall and on which said kettle is adapted to tilt and which is adapted to receive the wear occasioned by such tilting and thereby protect the wall of the kettle from such wear.

In testimony whereof, I have signed my name to this specification.

CHESTER GREENWOOD.